J. F. FORTH.
OPTICAL TESTING INSTRUMENT.
APPLICATION FILED SEPT. 12, 1908.
947,153.
Patented Jan. 18, 1910.
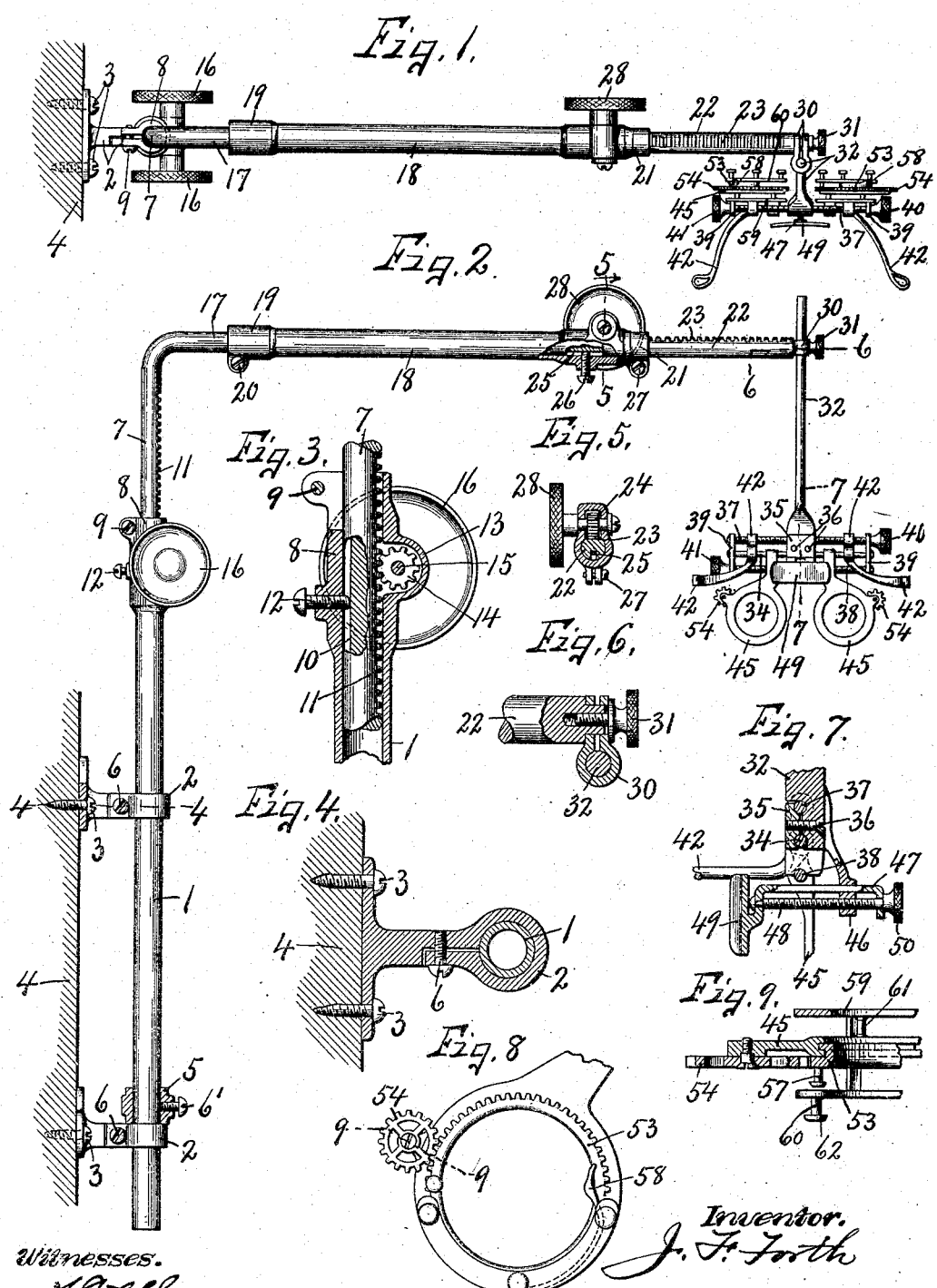

UNITED STATES PATENT OFFICE.

JOHN F. FORTH, OF SYRACUSE, NEW YORK.

OPTICAL TESTING INSTRUMENT.

947,153.  Specification of Letters Patent.  Patented Jan. 18, 1910.

Application filed September 12, 1908. Serial No. 452,706.

*To all whom it may concern:*

Be it known that I, JOHN F. FORTH, of Syracuse, in the county of Onondaga, in the State of New York, have invented new and useful Improvements in Optical Testing Instruments, of which the following, taken in connection with the accompanying drawings, is a full, clear, and exact description.

This invention relates to certain improvements in optical testing instruments of the class set forth in my Patent No. 874,179, issued December 17, 1907 except that in the present instance it refers more to means whereby the device may be supported upon a wall, desk, chair or similar support and also relates to certain vertically and horizontally adjustable parts of the main supporting bracket and to certain adjustable means whereby the head of the patient may be properly adjusted to the trial frames when testing the eyes.

One of the objects of my invention is to provide an optical testing instrument which may be readily applied to the side of a wall, desk or chair and which may be rotated or extended vertically and horizontally at will.

Another object is to provide the main supporting bracket with a separately adjustable support for the trial frame.

Another object is to provide the trial frame with a forehead rest adjustable relatively to the trial frames to permit the eyes of the patient to be brought to the same position relatively to the lenses at different trials.

Other objects and uses relating to specific parts of the device will be brought out in the following description.

In the drawings—Figure 1 is a top plan of my improved optical testing instrument as applied to the side of an upright support. Fig. 2 is a side elevation partly in section of the same instrument. Fig. 3 is an enlarged sectional view partly in elevation of telescoping portions of the main support showing means for adjusting one of the parts relatively to the other. Figs. 4, 5, 6 and 7 are sectional views taken respectively on lines 4—4, 5—5, 6—6 and 7—7, Fig. 2. Fig. 8 is a rear elevation of one of the lens holders of the trial frame and means for rotating the portion thereof carrying one of the lenses. Fig. 9 is a sectional view taken on line 9—9, Fig. 8.

In carrying out the objects stated, I provide an upright tubular supporting bar —1— which is rotatingly mounted and adjustable vertically in split bearings —2—, the latter being secured by suitable fastening means as screws —3— to the upright side of any suitable support —4— such as a wall, desk or chair.

A collar —5— is adjustably secured to the tubular post —1— by a screw —6— and normally rests upon one of the bearings as the lower bearing —2— to hold the post —1— in its adjusted position against downward movement relatively to the bearings —2— and at the same time permitting said tubular post —1— to rotate freely in said bearings which, however, may be tightened by screws —6'— to hold the tubular post —1— against rotation. This tubular post, however, may be adjusted in the bearing —2— by loosening the collar —5— and moving it to its adjusted position and again bringing the collar into engagement with the adjacent bearing and retightening the set screw —6— to hold the post against downward movement by its own gravity. This tubular post is provided with an adjustable extension —7— telescoping with the upper end thereof which is provided with a split head —8— and clamping screw —9— for holding the extension —7— in its adjusted position. This extension is also provided with a lengthwise key way —10— in one side and toothed rack —11— on its opposite side, the key-way —10— receiving one end of a screw —12— to prevent turning of the extension —7— and at the same time permitting its vertical adjustment relatively to the post —1—.

A portion of the head —8— is enlarged forming a housing —13— in which is placed a pinion —14— which is secured to a shaft —15— and meshes with the toothed rack —11— for adjusting the extension —7— vertically, said shaft and pinion being rotated by one or more, preferably two hand pieces —16— located at opposite sides of the head —8—.

The extension —7— is provided with a lateral horizontal offset —17— telescoping with one end of a horizontal tubular extension —18— having a split head —19— and clamping screw —20— for frictionally clamping the tubular extension —18— to the horizontal offset —17—.

The opposite end of the horizontal tubular extension —18— is provided with a split head —21— in which is adjustable a horizontal extension —22— having a toothed rack —23—, the latter meshing with a pinion —24— in the head —21— and provided with a lengthwise key-way —25— which receives the inner end of a screw —26— to prevent turning of the bar —22— and at the same time allowing its longitudinal movement in the head —21— and the extension —18—, said split heading having a screw —27— for frictionally clamping the bar —22— in its adjusted position. The pinion —24— is rotated by an external hand wheel —28— to permit the adjustment of the bar —22— to the desired position. The extreme outer end of the bar —22— is reduced in diameter and upon this reduced end is fitted a U-shaped clamp or split hub —30— which is held in place by a clamping screw —31— and is adapted to receive and retain an upright bar —32— for supporting the trial frames. The upper end of this bar is adjustable in the split hub —30— and is frictionally held in its adjusted position by the clamping screw —31—.

A horizontal guide bar —34— is clamped to the lower end of the bar —32— by means of a removable clamping plate —35— and suitable clamping screws —36— which clamping plate also serves to embrace and retain the central portions of a pair of adjusting screws —37— and —38— which are located at opposite sides of the guide bar —34—, the latter extending uniform distance beyond the lower end of the upright bar —32—. Secured to the opposite ends of this guide bar are bearing plates —39— in which the opposite ends of the screws —37— and —38— are journaled, the intermediate portions of said screws being threaded and their opposite outer ends provided with hand pieces —40— and —41— whereby the screws may be turned by hand.

A pair of temple guards —42— are mounted upon the guide rod —34— equi-distant from opposite sides of the lower end of the bar —32— to slide lengthwise thereof, said temple guards being provided with threaded apertures for receiving the screw —37—, the portions of the screw —37— at opposite sides of the lower end of the bar —32— being of opposite pitch or right and left hand and the threaded apertures in the temple guards —42— are made to correspond with the threads of opposite pitch so that when the adjusting screw —37— is rotated by hand, the temple guards will be adjusted in opposite directions to the same degree toward or from the adjacent portion of the bar —32— thereby permitting the temple guards to conform to foreheads of different widths.

A pair of trial frames —45— are mounted upon and depend from the guide rod —34— equi-distant from opposite sides of the rods —32— and are also provided with alined threaded apertures engaging the screw —38—, the opposite ends of which are of different pitch to cause the trial frames to move in opposite directions as the screw is rotated.

Secured to the lower end of the vertical bars —32— is a pendent arm —46— in which is mounted a horizontally sliding bar —47— and a screw —48—, the sliding bar —47— being provided at its front end with a forehead rest or plate —49— disposed in a plane in front of the trial frames —45—, said sliding bar together with the forehead rest —49— being adapted to be adjusted horizontally by the screw —48— to bring the forehead rest —49— nearer to or farther from the trial frames —45— as may be necessitated by the condition of the eyes of the patient, the screw —48— engaging a threaded aperture in the pendent arm —46— and has its opposite ends journaled in the bar —47— at the front and rear of said arms —46— and is provided at its rear end with a hand piece —50— for rotating the screw and thereby adjusting the forehead rest —49— to the desired position relatively to the trial frames —45—.

Each of the trial frames —45— is provided with an annular groove in which is journaled a rotary lens holder ring —53— having a toothed periphery engaged by a toothed idler —54—, the latter being journaled on the frame —45— at the outside of the periphery of the ring —53— and serves as a means for rotating the ring —53— with one or more lenses thereon. This ring —53— is provided with three point-bearings for the lenses and is also provided with a spring detent —58— adapted to engage the periphery of the lens to frictionally hold it in place during the fitting of the lenses to the eyes. In addition to this rotary lens holder ring —53— I have provided additional lens holders —59— and —60— located respectively at the front and rear of the ring —53— and frame —45—, each of said lens holders being provided with three point-bearings —61— and —62— for the lenses.

Each of the trial frames —45— is made in ring form and graduated in the usual manner to indicate the position of the optical axis of the lenses during the operation of testing the eyes.

It is apparent from the foregoing description that aside from the ability to clamp this entire device to a wall, desk or chair, it may be extended vertically by rotating the hand wheel —16— to bring the trial frames —45— to the desired height for the eyes of the person when in a standing or sitting position or said trial frames may be adjusted horizontally by the hand wheel —28— to conform to the position of the patient. In addition to these adjustments the bar —32— carrying the trial frames may be adjusted vertically or may be rotated to bring the trial frames to any horizontal angle by simply loosening the screw —41— after which it may be retightened to hold the trial frames in their adjusted positions.

The temple guards may be adjusted laterally toward and from the other by the screw —37— to conform to foreheads of different widths while the trial frames —45— may be similarly adjusted by means of the screw —38— to conform to the different pupilary distances of different patients.

One of the important features of my invention, however, is the provision of the forehead guard —49— and means for adjusting the same toward and from the trial frames so that in testing the eyes for different lenses the eyes of the patient may each time be brought to the position of the lenses or trial frames.

When the lenses are placed in the rotary supporting ring —53—, the latter may be rotated around the graduations by means of the hand wheels —54— thus affording a convenient means for adjusting the lenses to the eyes.

What I claim is:

1. In an optical testing instrument, a wall bracket, an upright tubular standard adjustable vertically in said bracket, means for holding the tube in its adjusted position, an extension bar guided in the tube and provided with a lateral offset, means for raising and lowering said extension bar, a separate extension bar mounted on the lateral offset and provided with an adjustable horizontal extension, means for adjusting said horizontal extension, a vertically adjustable bar mounted on said extension, and trial frames on the vertically adjustable bar.

2. In an optical testing instrument, a horizontal guide rod, a support for the guide rod, screws journaled on the support parallel with the guide rod and each provided with a right hand thread and a left hand thread at opposite sides of the support, trial frames having nuts engaging the threads of one screw, temple guards having nuts engaging the threads of the other screw, a pendent arm on the support, and a forehead rest slidably mounted on the pendent arm between the trial frames.

3. In an optical testing instrument, a support for a guide rod, a screw centrally journaled on the support and having its ends threaded in opposite directions, a guide rod on the support parallel with said screw, trial frames slidable on said rod at opposite sides of the support and provided with nuts engaging the threads of the screw, a forehead rest slidable on the support at right angles to the screw, and a separate screw for adjusting said rest.

4. In an optical testing instrument, an upright supporting bar having a pendent arm provided with a threaded aperture and a guide opening, a horizontal guide rod mounted on the bar, a screw centrally journaled in the upright bar parallel with the guide rod, trial frames slidable on the opposite ends of the guide rod and provided with nuts engaging said screw, a forehead rest slidable in said guide opening in the pendent arm, and an adjusting screw engaged in the threaded aperture of said pendent arm and also engaged with the forehead rest for moving the latter back and forth.

It witness whereof I have hereunto set my hand this 7th day of September 1908.

JOHN F. FORTH.

Witnesses:
H. E. CHASE,
CAROLINE M. MCCORMACK.